(12) United States Patent
Hanley et al.

(10) Patent No.: US 11,640,626 B2
(45) Date of Patent: May 2, 2023

(54) QUEUE MONITORING TECHNIQUES

(71) Applicant: Universal City Studios LLC, Universal City, CA (US)

(72) Inventors: Kyle P. Hanley, Orlando, FL (US); Thomas Martin Geraghty, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1161 days.

(21) Appl. No.: 16/178,424

(22) Filed: Nov. 1, 2018

(65) Prior Publication Data

US 2019/0139104 A1   May 9, 2019

Related U.S. Application Data

(60) Provisional application No. 62/656,225, filed on Apr. 11, 2018, provisional application No. 62/581,182, filed on Nov. 3, 2017.

(51) Int. Cl.
*G06Q 10/00* (2012.01)
*G06Q 30/02* (2023.01)
(Continued)

(52) U.S. Cl.
CPC ......... *G06Q 30/0281* (2013.01); *G06Q 10/02* (2013.01); *G07C 9/00* (2013.01);
(Continued)

(58) Field of Classification Search
CPC .................................................... G06Q 10/02
See application file for complete search history.

(56) References Cited

U.S. PATENT DOCUMENTS 6,173,209 B1 * 1/2001 Laval .................... G06Q 30/02
235/382
7,222,080 B2   5/2007 Hale et al.
(Continued)

FOREIGN PATENT DOCUMENTS

CN   101444003 A   5/2009
CN   101889437 A   11/2010
(Continued)

OTHER PUBLICATIONS

CN 201880070793.0 Office Action dated Dec. 2, 2021.
(Continued)

*Primary Examiner* — Tonya Joseph
(74) *Attorney, Agent, or Firm* — Fletcher Yoder P.C.

(57) ABSTRACT

A queue monitoring system includes at least one sensor configured to monitor guests admitted from an entrance and generate a sensor signal. The system also includes a virtual queue controller comprising a processor and communications circuitry, wherein the virtual queue controller is configured to: communicate guest admittance information to an operator device, the guest admittance information causing the operator device to display a target number of guests to be admitted during a time interval; determine a count of guests admitted from the entrance during the time interval based on the sensor signal; determine a remaining number representative of remaining guests to be admitted based on the target number and the count of guests admitted from the entrance; and communicate a standby admit signal to the operator device to cause the operator device to display the remaining number.

20 Claims, 9 Drawing Sheets

(51) Int. Cl.
  *G07C 11/00* (2006.01)
  *G06Q 10/02* (2012.01)
  *G07C 9/20* (2020.01)
  *G07C 9/10* (2020.01)
  *G07C 9/00* (2020.01)

(52) U.S. Cl.
  CPC ............... *G07C 9/10* (2020.01); *G07C 9/20* (2020.01); *G07C 11/00* (2013.01); *G07C 2011/02* (2013.01); *G07C 2011/04* (2013.01)

(56) References Cited

U.S. PATENT DOCUMENTS

| | | | | |
|---|---|---|---|---|
| 2002/0007292 | A1* | 1/2002 | Paxton | G07C 11/00 705/6 |
| 2002/0116235 | A1* | 8/2002 | Grimm | G06Q 10/02 705/5 |
| 2003/0102956 | A1* | 6/2003 | McManus | G07C 11/00 340/5.2 |
| 2009/0224872 | A1 | 9/2009 | Naccache et al. | |
| 2016/0055429 | A1 | 2/2016 | Schwartz | |
| 2017/0200082 | A1* | 7/2017 | Böhm | H04W 4/42 |

FOREIGN PATENT DOCUMENTS

| | | |
|---|---|---|
| CN | 101918956 A | 12/2010 |
| JP | S54128400 A | 10/1979 |
| JP | 2007509396 A | 4/2007 |
| JP | 2011215787 A | 10/2011 |
| WO | 02063436 | 8/2002 |

OTHER PUBLICATIONS

PCT/US2018/059032 International Search Report and Written Opinion dated Feb. 11, 2019.

JP Office Action for Japanese Application No. 2020-524516 dated Oct. 26, 2022.

* cited by examiner

QUEUE MONITORING TECHNIQUES

CROSS-REFERENCE TO RELATED APPLICATIONS

The present application claims priority to and the benefit of U.S. Provisional Application No. 62/581,182, entitled "QUEUE MONITORING TECHNIQUES" and filed Nov. 3, 2017, the disclosure of which is incorporated by reference herein for all purposes. The present application also claims priority to and the benefit of U.S. Provisional Application No. 62/656,225, entitled "QUEUE MONITORING TECHNIQUES" and filed Apr. 11, 2018, the disclosure of which is incorporated by reference herein for all purposes.

BACKGROUND

The present disclosure relates generally to the field of amusement parks. Specifically, embodiments of the present disclosure relate to techniques to manage amusement park experiences, including queuing for attractions.

Since the early twentieth century, amusement parks have substantially grown in popularity. In order to address this increasing demand, amusement parks have been expanding by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. Further, due to operating efficiencies, it is often desirable to limit the availability of attractions during low attendance times. Thus, queuing for attractions, which may limit participation in park activities, is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have waited hours in line to experience some of the more popular attractions at an amusement park. Additionally, it is now recognized that park capacity does not always result in efficient guest utilization of that capacity due to individual guest preferences for certain attractions over others. Accordingly, it is now recognized that it is desirable to improve amusement park queuing systems and methods.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a queue monitoring system is provided that includes at least one sensor configured to monitor guests admitted from an entrance and generate a sensor signal. The system also includes a virtual queue controller comprising a processor and communications circuitry, wherein the virtual queue controller is configured to: communicate guest admittance information to an operator device, the guest admittance information causing the operator device to display a target number of guests to be admitted during a time interval; determine a count of guests admitted from the entrance during the time interval based on the sensor signal; determine a remaining number representative of remaining guests to be admitted based on the target number and the count of guests admitted from the entrance; and communicate a standby admit signal to the operator device to cause the operator device to display the remaining number.

In an embodiment, a queue monitoring method is provided that includes the steps of starting a time interval for admittance via an entrance; providing a target guest admittance of the time interval; receiving a count of guests admitted via the entrance; determining standby admittance information based on a difference between the received count and the target guest admittance of the time interval, wherein the standby admittance information comprises a remaining number of admittances to be admitted via a standby entrance; and communicating a standby admit signal to an operator device to cause the operator device to display the remaining number of admittances to be admitted via the standby entrance.

In an embodiment, a queue monitoring system is provided that includes a virtual queue controller. The virtual queue controller includes a processor and communications circuitry, wherein the virtual queue controller is configured to: communicate guest admittance information comprising a target number of guests to be admitted during a time interval; determine a count of guests admitted from the entrance during the time interval based on a generated sensor signal; and determine standby information, the standby information comprising a remaining number of standby guests to be admitted based on the target number and the count of guests admitted from the entrance; and communicate the standby information based on the remaining number. The queue monitoring system also includes an operator device configured to receive the guest admittance information and the standby information display the target number and time interval information comprising time remaining in the time interval display the standby information; and receive an operator input of standby guest admittances during the time interval.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Theme park or amusement park attractions have become increasingly popular, and various amusement park attractions have been created to provide passengers with unique motion and visual experiences. Guests entering the various amusement park attractions may utilize a queue monitoring system that places the guests in a virtual queue rather than a physical queue, which allows the guests to enjoy other features of the amusement park while their position in the virtual queue advances. By introducing virtual queue functionality to an attraction, the flow of guests arriving at the attraction is impacted. When using the queue monitoring system, a guest is given a return time range to enter the attraction. Because the guest is not required to return at an exact time, and due to other factors described herein, the flow of guests returning to the attraction varies throughout the day and is challenging to predict.

The rate at which guests approach a given attraction in our parks involves some randomness. Factors such as time of day, other events occurring in and around the park, whether or not guests have a special access entitlement, and typical guest behavior contribute to an unsteady flow of traffic to an attraction. In order to operate our attractions efficiently, it is beneficial to have a steady flow of guests ready to enter the attraction at each load cycle (e.g., loading ride vehicles of the attraction). This can be achieved by admitting guests not in the virtual queue to a standby queue for the attraction such that, at a particular time, a total number of guests in the standby queue and with matured return times (i.e., valid for the current time) in the virtual queue are more than the attraction can carry to account for any lapses in traffic. However, again due to variability in guest behavior, doing so may cause increased wait times for guests. The queue monitoring techniques provided herein address this problem.

With this in mind, certain embodiments of the present disclosure relate to queue monitoring systems. The queue monitoring system may help to prevent ride underutilization, ride overcrowding, and/or inefficient use of ride resources over a period of time.

Figure 1:
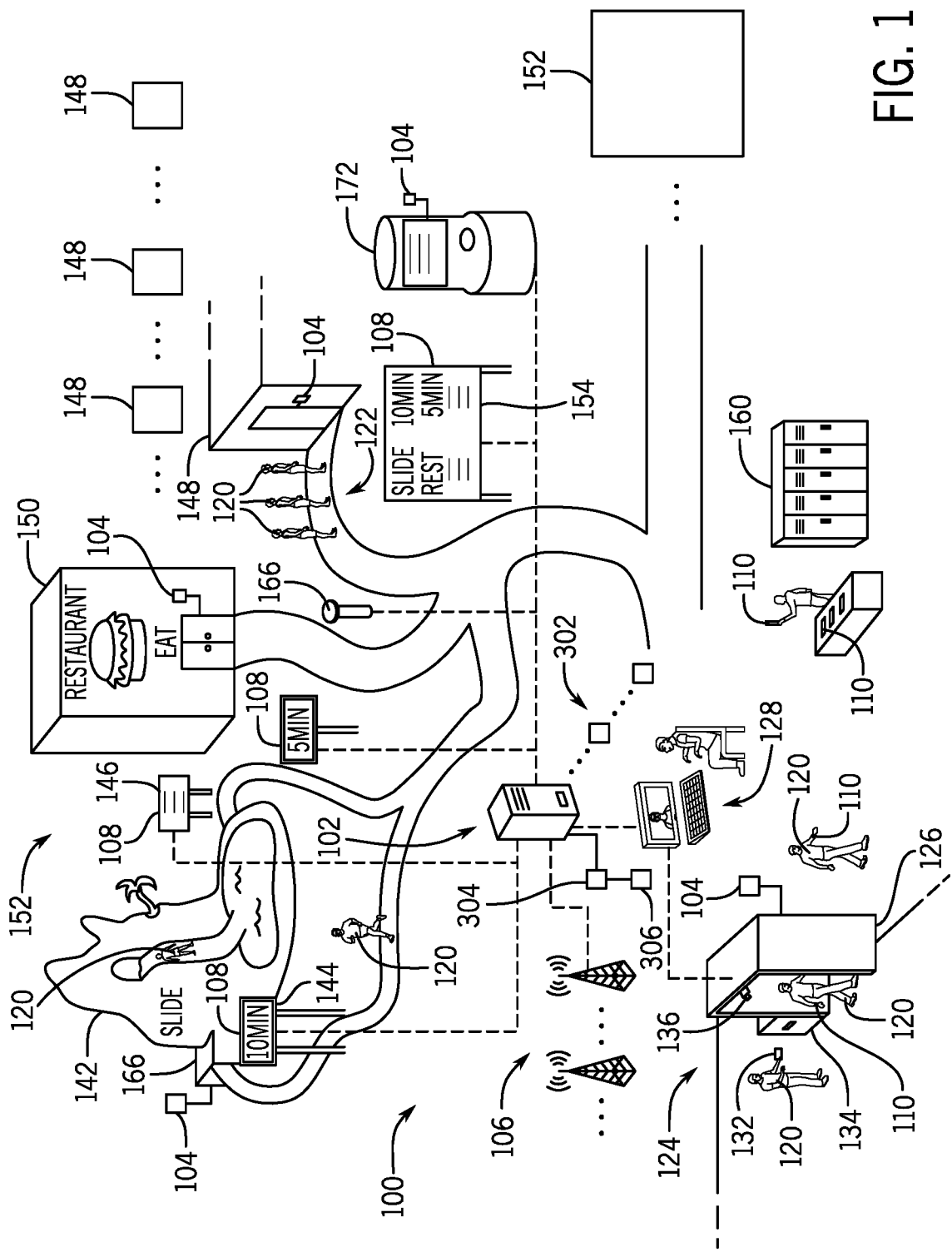
FIG. 1 is a schematic view of a theme park including a queue monitoring system in accordance with present techniques.

FIG. 1 is a schematic representation of a system 100 for facilitating queuing in accordance with present embodiments. The system 100 includes a computer system 102, monitoring sensors 104, a wireless communication system 106, system displays 108, guest-associated devices 110 (e.g., a bracelet including accessible data and communication features, a guest mobile device) and other components that coordinate in accordance with present embodiments, as will be described in detail below. Specifically, it should be noted that present embodiments facilitate virtual queuing such that amusement park guests 120 can obtain a position within a virtual queue and subsequently enter a physical queue or standby loading group 122 of limited length. Present embodiments may function to limit time spent by guests 120 in physically waiting 122 and encourage participation in other areas of an amusement park, such as dining, shopping, and other entertainment venues (e.g., rides, shows). Accordingly, in one embodiment, the attraction queue is mediated via the virtual queue and a standby queue. Further, admittance to the virtual queue may be open to guests with mature return times. For example, a guest with a return time range of 2 pm-2:15 pm has a mature return time at or after 2 pm and will be admitted to the virtual queue entrance at any time at or after 2 pm that day while the ride is open. While certain guests will be more likely to present themselves at the virtual queue entrance within their return time range, other guests may be delayed until after the time associated with their return time, creating variability in the number of guests that enter via the virtual queue. That is, while the return times for each time slot may be distributed to encourage a steady flow of guests (e.g., via distributing a particular number of return times at each time slot), the actual entry via the virtual queue is more unpredictable. In addition, the virtual queue may also allow guests with entitlement passes to be admitted. Because such guests do not have return times, their entry may also be unpredictable.

When guests 120 arrive at a ticketing location 124 (e.g., hotel front desk, kiosk, guest service counter, park gate), the guests 120 may be provided with entry credentials (e.g., tickets or active wearables 110) among other items, such as a park map, virtual queuing instructions, and amenities instructions. Informational media (e.g., audio, video) and instructional signage may be present at all such ticketing locations 124. In some instances, guests 120 may have obtained entry credentials prior to arrival and may skip acquiring such credentials at the ticketing location 124.

Guests may enter and be provided entry into the park or a park area via an entryway 126. Specifically, as illustrated in FIG. 1, the entryway 126 may exclude a physical turnstile or similar physical traversal counting or control features that can provide an impediment to traversal of the entryway 126 when the entryway 126 is intended to be open. That is, the entryway 126 may be turnstile-less during operation. If guests 120 already have their entry credentials or an identification code or number transferred into an active wearable ("AW") or guest-associated device 110, the guests 120 may be provided essentially direct access to the park or park area. For example, guests 120 with properly activated guest-associated devices 110 may be allowed to walk through the entryway 126 without stopping. The credentials associated with the guest-associated device 110 being held or worn by the guests 120 will be detected and provided to a gate monitoring facility 128 that may be monitored by a park employee (e.g., a security service company). For example, this may include providing a photograph of the guest 120 (e.g., a photograph of the guest's face) passing through the entryway 126. Thus, the photograph may be used for entry privilege confirmation. In other embodiments, other features may be used, such as fingerprints or other identifying aspects (e.g., facial recognition). While certain embodiments of the disclosure are illustrated in conjunction with a guest-associated device 110, it should be understood that the disclosed techniques may be implemented with guest-associated devices that are configured to wirelessly communicate guest information, such as pocket-carried devices, handheld devices, or mobile devices. In particular embodiments, the guest-associated devices are waterproof.

If guests 120 do not have their guest-associated device 110 with them or if their guest-associated device 110 is not properly activated, they may insert ticket media 132 into a scanner 134, which facilitates transfer of information to the gate monitoring facility 128, which may include any of a number of gate monitoring systems, and informs a park employee that the guest 120 is authorized to enter the park or park area. If authorization is granted in this manner, a guest-associated device 110 may be distributed to them and a photograph of the guest's face automatically taken. For example, a photograph may be automatically taken by a camera 136 positioned proximate the entryway 126. The same camera 136 may be used for monitoring purposes as well, e.g., for monitoring guest entrance and/or exit from attraction environments. In other embodiments, the picture of guests 120 acquiring their guest-associated device 110 may occur in a different location. Further, in some embodiments, the guests 120 may acquire their guest-associated device 110 after progressing through the entryway 126 or prior to progressing through the entryway 126.

Wait times may be ascertained by guests by viewing displays provided at numerous locations throughout the park or park area. At certain or all attractions, displays 108 provide the wait time for the specific attraction. For example, the water slide 142 includes a display 144 that specifically provides a wait time for that attraction. The information for each display may be provided based on information obtained by tracking AWs 110 or otherwise monitoring park areas (e.g., ride exits and entrances) with monitoring sensors 104. Further, at the exit of certain or all attractions, a display may be provided to indicate the wait times for all attractions (e.g., all attractions in the park or park area). For example, the exit area of the water slide 142 includes a display 146 that may provide wait times for all of the surrounding attractions (e.g., rides 148). The display 146 may even provide wait times for non-ride attractions, such as a wait time for a restaurant 150. The display 146 may be limited to display of wait times for attractions within a particular park area 152 (e.g., a park "village"). Also, within each park area 152, one or more wait time boards 154 (e.g., centrally located displays 108) may indicate wait times for all park attractions or attractions within the park area 152. Further still, before guests 120 place their portable devices (e.g., mobile phones) into lockers 160, mobile applications may be used via the mobile devices to ascertain wait times.

In one embodiment, the guest 120 enters the queue by walking to the attraction entry and walking through an entry portal. For example, the guest 120 may walk to the water slide 142 and walk through its attraction station 166. Once the guest 120 walks through the portal 166, the guest's guest-associated device 110 will notify him/her (e.g., via a tone, vibration, illuminator) of being added to the virtual queue. This may be achieved by detecting the guest-associated device 110 with the monitoring sensor 104 at the attraction station 166 and via aspects of the guest-associated device 110, which will be discussed further below. In another embodiment, the guest 120 may enter the virtual queue by walking to a queue entry post 168, which may indicate the name of the attraction and current wait time, and engaging the post 168 with the guest-associated device 110. This may include tapping the guest-associated device 110 against or positioning it near the post 168. The posts 168 may be located at the exit or entry of each attraction and at a central location within each park area 152 or village. In one embodiment, an individual post 168 may be associated with only one attraction such that engaging with the post 168 automatically enters the guest 120 in the virtual queue of the associated attraction, e.g., the virtual queue is entered without any guest selection between different attractions at the post 168, and tapping or engaging the post is the selection step for selecting the associated attraction. In particular embodiments, the queue entry post 168 and/or the attraction station 166, when positioned proximate an attraction, may function as an entrance validator for guests already in a virtual queue.

The queue entry post 168 and the attraction station 166 may have similar functionality to one another for adding guests to a virtual queue. In addition, the attraction station 166, when positioned proximate the attraction, such as at the ride entry, may also include functionality for communicating if the guest has a valid entry position to the attraction. Validation may include near field communication with the guest-associated device 110 to access the user identification associated with the guest-associated device 110 when a guest taps in to the attraction station 166. The user identification is then communicated to a central virtual queue control system remote from the attraction station 166, which in turn accesses the real-time queue position associated with the user identification, performs rules-based filtering, and provides a validation output of a valid or an invalid position in the virtual queue for attraction entry. For example, in one example of rules-based filtering, when a guest position is at the front of the virtual queue (position 1), the guest is validated for admission. In other embodiments, when the guest position is in a front group (e.g., positions 1-10), the guest is validated for admission. In one embodiment, to encourage guests to return to the attraction for entry, all positions in the virtual queue less than a predetermined number (e.g., 10 or 5) are displayed as position 1 or are displayed on the guest-associated device 110 or otherwise indicated as being valid for entry (e.g., tone, vibration, display). In another example, when guests in positions 1–x in the virtual queue are not yet present at the attraction, and the guest is position x+1, the guest is validated. However, the value of x may be defined to be relatively small (10 or less) so that guests are not encouraged to present themselves at an attraction well in advance of gaining an entry position. Validity is indicated to the guest via near field communication to the guest-associated device 110 or one or both of a notification on the guest-associated device 110 or via a notification on the attraction station 166 (e.g., a tone or display).

Once the guest engages the queue entry post 168, the guest's guest-associated device 110 will notify the guest (e.g., via a tone, vibration, illuminator) of being added to the virtual queue. For example, the guest-associated device 110 may receive a signal to cause the displayed information on the guest-associated device 110 to change. Further, the post 168 may additionally or alternatively provide a notification of successful addition to the queue. The notification may be generated and/or communicated by a central virtual queue control system to the guest-associated device 110. In another embodiment, the notification is generated and/or communicated by the queue entry post 168. In yet another embodiment, the guest 120 may enter the virtual queue by walking to a virtual queue station, which may be implemented as a queue kiosk 172 (e.g., a single device that displays the names and wait times for all virtual queuing attractions in the park or park area). Queue kiosks 172 may be located at the entry or exit of each attraction and in a central location within each park area 152. The guest 120 selects the queue he/she wishes to enter and engages (e.g., taps) the kiosk with his/her guest-associated device 110. Once the guest 120 engages the queue kiosk 172, the guest's guest-associated device 110 will notify the guest 120 (e.g., via a tone, vibration, illuminator) of being added to the virtual queue. For example, the guest-associated device 110 may receive a signal to cause the displayed information on the guest-associated device 110 to change. Further, the kiosk 172 may additionally or alternatively provide a notification of successful addition to the queue. The notification to the guest-associated device 110 may be communicated via a near field communicator of the queue kiosk 172. Alternatively, the notification to the guest-associated device 110 may be communicated via a long or medium range communicator and may be communicated from a central control system and not from the queue kiosk 172.

In each of the embodiments discussed above, the guest's guest-associated device 110 may display the estimated return time. For example, a display on the guest-associated device 110 may provide a time (e.g., 5:02 PM) by which the guest should return to enter a loading group 122. Present embodiments facilitate monitoring or waiting in the virtual queue. Guests 120 may wait in the virtual queue by experiencing instantaneous capacity attractions (e.g., a wave pool, swimming pool, splash pad, lazy river, a ride with no wait time), visiting food, beverage, or merchandising locations, or simply relaxing (e.g., resting in a lounge chair). If an attraction wait time of a virtual queue changes, this information may be provided via the communication system 106 to the guest-associated device 110, which will notify the wearing guest 120 and display the updated wait time. If a guest 120 wishes to leave a current virtual queue for another virtual queue, he/she can do so by just joining a new virtual queue as set forth in the description of the various embodiments above. If a guest leaves the park (or, in some cases, a park area) while waiting in a virtual queue, he/she is automatically removed from any virtual queues he/she is currently in. Present embodiments may establish no geographical limits within the park while waiting in a virtual queue and guests 120 may be free to go to any location and perform any task within the park.

Present embodiments encourage initiating and participating in attraction experiences. In some embodiments, the queue monitoring system 100 will notify the guest 120 prior to the guest's ride time. To determine the amount of prior notification time, the system 100 will utilize multiple factors to optimize capacity: current wait time at the attraction, current distance of the guest 120 away from the attraction, the guest's current activity, and the guest's history for arrival speeds from previous virtual queues. Once the guest is notified, the guest 120 travels to the attraction and walks to the load platform, which accommodates the limited standby group 122. These factors or variables are monitored by the computer system 102 (e.g., a network of computers 302), which includes at least one processor 304 and at least one memory 306, via communication with the monitoring sensors 104. To ensure that the attraction throughput is not starved, a small standby group 122 (less than 10 minutes) may be formed prior to the load platform at each attraction and may in certain embodiments form a standby line.

The guest-associated device 110 will be linked to the guest's personal profile account on a database and will be configured to interact with kiosks distributed throughout the park. This interaction between the guest-associated device 110 and the kiosks will allow the guest to reserve and order items in the park. For example, a guest may reserve VQ slots, cabanas, lockers, towels, etc., using self-serve kiosks, enter and secure lockers and cabanas, and allows guests to purchase food, beverages, and items using the credit card attached to the guest profile in the database. When leaving the park, guests will be prompted to return the wearable; the returned wearable is noted to their account, the payment method is disassociated with the returned wearable, and the device is ready to be cleaned for reuse the next day.

Guests enter virtual queues at certain attractions (e.g., rides). Guests secure entry to virtual queues by tapping the wearable at the virtual queue reservation point, kiosk, or ride entry station, which may be positioned at the attractions. Once secured, the wearable continues to receive updated information from the park system and wait times are updated and displayed on the guest's wearable. In some embodiments, guests can enter a maximum of two virtual queues and have the virtual queue status displayed on their wearable at any one time. In accordance with present embodiments, attractions in a park may be divided into two classes (e.g., those with a long lead time and those with shorter lead times) and the two VQs a single guest may enter at any one time may be limited to one of each type.

The queue monitoring system application is a tool that enables a ride or show operator to maintain a steady traffic pattern when the number of guests entering through a virtual queue entrance varies over time. The system operates by admitting guests through a standby entrance at regular time intervals. The number of guests admitted through the standby entrance at each interval is based on the attraction's operating capacity and the number of guests entering via the virtual queue entrance during the previous time intervals.

The system may include an operator interface (e.g., operator interface 332 of FIG. 2 and/or operator interface 414 of FIG. 3) where the system's status is monitored; operating parameters can be adjusted; and the system can be started, paused, resumed and reset. The system may further include a display located at the standby entrance that instructs an operator to admit up to a specified number of guests. The system may also include people-counting devices (such as a ticket scanner, an infrared beam counter, overhead thermal or video camera, physical turnstile or other sensor) that counts the number of guests passing the sensor. For example, one or more sensors may be located at each entrance.

Using the operator interface, an operator sets the ride's hourly capacity and standby interval, then starts the system. Further, via the operator interface, manual downtimes for the attraction may be entered. If such downtimes involve interruptions to the operation of the attraction, the system may be configured to present new return times for guests scheduled to return during the attraction downtime. Guests may be permitted to select among offered return times.

During each time interval, the number of guests admitted through the virtual queue entrance is counted by the people-counting method (e.g., counter, sensor as provided herein). Guests with appropriate credentials are permitted to continually enter the virtual queue entrance.

At the end of each interval, the standby entrance display (e.g., the queue monitoring device 333 of FIG. 2 and/or the monitoring device 466 of FIG. 3) indicates how many guests to admit via the standby entrance during the next interval. The algorithm to determine how many standby guests enter may use various inputs and provided herein. For example, the inputs may be all previous guest entries from both the virtual queue and standby entrances.

The people-counting method at the standby entrance counts guests as they enter and updates the standby entrance display. When no further guests should enter via the standby entrance, the standby entrance display instructs the operator to wait.

The above steps repeat during operation of the attraction, filling unused capacity with guests from the standby queue.

The present techniques operate such that the virtual queue entrance has improved traffic flow. The system is independent from an individual show cycle and as a result can accommodate traffic variations over a larger period of time vs. a single ride cycle. The automated nature of the system eliminates the manual counting or guesswork by the team member operating the standby entrance. The system does not require the queue entrances to be located in close proximity. This is particularly advantageous in cases where guests in the standby queue are physically spaced apart from guests in the virtual queue such that a single operator cannot determine how many virtual queue guests vs. standby guests are present.

Inputs to the queue monitoring system may include one or more of the following: Hourly Ride Capacity (e.g., a number of guests that can experience the attraction per hour, which may be set by an operator via the operator interface); Cycle Time (e.g. a time per attraction cycle); Cycle Capacity (e.g., a number of accommodated guests per attraction cycle, which may be pre-set based on attraction run time as well and/or time spent in pre-show and/or loading); Time Remaining (time remaining in cycle); Overruns (calculated by the system); virtual queue admits (a number of guests admitted during a cycle as provided via a signal from the queue monitoring device); standby pending (standby guests in line as provided via a signal from the queue monitoring device); Standby Admit Now (output to queue monitoring device with standby admit instructions); Standby Admits (standby guests admitted as provided via a signal from the queue monitoring device); Paused/Unpaused; Number of Cycles; Total Run Time; Total Capacity; VQ Admits; SB Admits; Cycle Time in Seconds.

For example, if a cycle capacity is 40 total guests and there are no virtual queue guests available, the instructions will cause a display of 40 standby admits for the cycle (e.g., 2 minutes). The admits may be admitted as a group to improve flow through the cycle. Once admitted, the display instructions will update to indicate that the cycle is full and no admits are available for the standby queue for the remainder of the cycle. At the end of the cycle, the instructions are updated to indicate a new group of 40 potential admits. If virtual queue guests are available, all virtual queue guests are admitted until the capacity is full or until there are no more virtual queue guests available. If all virtual queue guests are admitted and there is remaining capacity in the cycle (e.g., 10 spaces) during the remaining cycle time, standby queue guests are admitted as a group if available or on a rolling basis for the remainder of the cycle to fill the remaining spots. Accordingly, the system does not employ a preset ratio of virtual queue vs. standby guests, but instead responds to real-time traffic conditions to dynamically alter the admittance from the standby queue based on the virtual queue conditions and to fill the attraction.

In one embodiment, it is contemplated that the queue monitoring system is independent of the virtual queue return time distributor, such that the queue monitoring system responds to guest inflow but does not provide feedback to influence or alter the distribution of return times.

Figure 2:
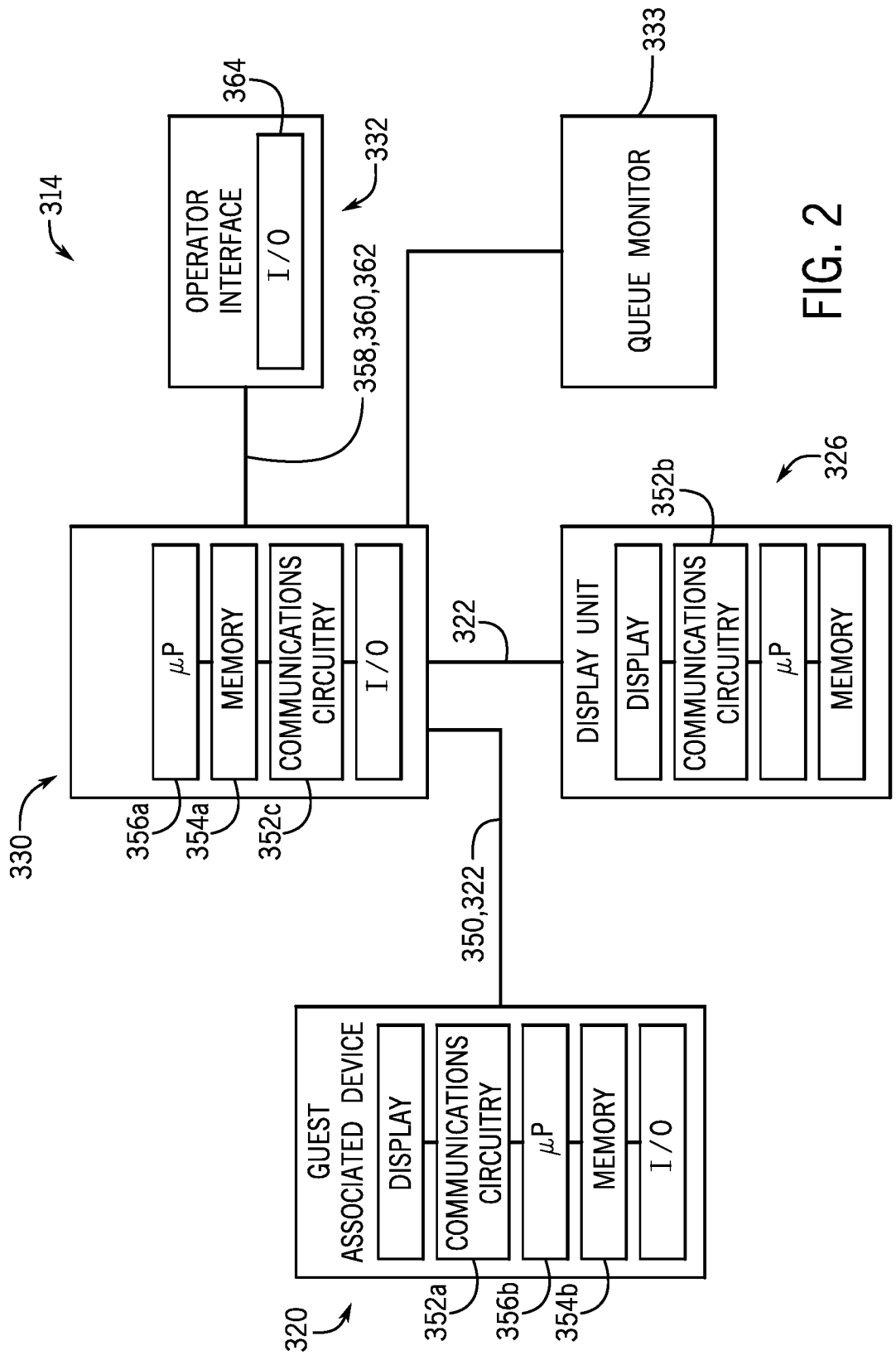
FIG. 2 is a block diagram of a queue monitoring system in accordance with present techniques.

FIG. 2 is a block diagram of the queue monitoring system 314. The queue monitoring system includes a virtual queue controller 330 (e.g., the virtual queue controller 130) in communication with the guest-associated device 320, the display unit 326, or a combination thereof. To enter the virtual queue for an attraction, the guest-associated device 320 transmits a queue request signal 350 to the virtual queue controller 330 in response to an input from a guest. The virtual queue controller 330 receives the queue request signal 350, determines a wait time for the guest, and outputs a wait time signal 322 to the guest-associated device 320, the display unit 326, or a combination thereof. The guest-associated device 320 and the display unit 326 are configured to receive the wait time signal 322 and display the wait time for the guest. To enable these communications, the guest-associated device 320, the display unit 326, and the virtual queue controller 330 may include communications circuitry 352, such as antennas, radio transceiver circuits, signal processing hardware and/or software (e.g., hardware or software filters, A/D converters, multiplexer amplifiers), or a combination thereof. The communications circuitry 352 may be configured to communicate over wired or wireless communication paths via IR wireless communication, satellite communication, broadcast radio, microwave radio, Bluetooth, Zigbee, Wifi, UHF, NFC, etc. Such communication may also include intermediate communications devices, such as radio towers, cell towers, etc.

In certain embodiments, the virtual queue controller 330 may include a memory device 354a storing instructions executable by a processor 356a to perform the methods and control actions described herein. For example, the processor 356a may execute instructions for monitoring virtual queue conditions and determining wait times for guests and guest admittance information (e.g., standby admits) based on guest throughput inputs 358 and ride schedule data inputs 360 received by the virtual queue controller 330. The ride schedule data inputs may be received through user input, from a memory storage, and/or through cloud services. The virtual queue controller 330 may receive scheduling (or re-scheduling) information in real-time, and may be configured to update wait times based on the updated schedule. In certain embodiments, the virtual queue controller 330 may receive and utilize additional inputs in combination with the ride schedule data inputs 360 and guest throughput inputs 358 when determining wait times.

The processor 356a of the virtual queue controller 330 may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, the virtual queue controller 330 may be accessed by an operator interface 332 (e.g., a computer-based workstation or a mobile device, and/or may include an input/output interface 364 and a display).

In certain embodiments, the guest-associated device 320, having a processor 356b and a memory 354b, may be a personal guest device (e.g., smart phone, tablet, laptop, etc.) or a park queue device assigned to guests (e.g., smart wrist bands, active werables, portable communication devices, etc.). Park queue devices include a program for viewing wait times and sending queue requests. Guests using personal guest devices may be given access to the program (e.g., web based program, smart phone app., downloadable program, etc.). For example, an admission ticket to the theme park or a confirmation email may include details for finding the program, as well as a username, a passcode, or a combination thereof, for accessing the program. Personal information associated with a guest (height, weight, age, and other demographics) may be linked to the username and/or passcode, such that the guest identification information may be transmitted with the queue request signal. A guest using park queue devices may have their guest information uploaded to the park queue device when the device is assigned to the guest. The virtual queue controller 330 may utilize guest identification information determining wait times as provided herein.

In certain embodiments, system may include a queue station (e.g., guest kiosk) that includes a processor and a memory, and that is configured to provide an additional resource for guests to view times and send queue requests. Guests may access queuing functionality on the queue station using a form of guest identification (e.g., username, passcode, card, RF wristband, personal information, etc.). Queue stations may be disposed at various locations around the theme park. In some embodiments, at least one queue station is disposed proximate the attraction, such that guests are provided a means to queue for the attraction at a location proximate the attraction. In some embodiments, queue stations may only permit guests to queue for the attraction most proximate the queue station. In other embodiments, general queue stations are throughout the theme park 110, which may be used to queue for attraction in the theme park.

In certain embodiments, the display unit 326 is configured to receive the wait time signal 322 from the virtual queue controller 330 and display current wait times for the attractions. In some embodiments, at least one display unit 326 is disposed proximate each attraction. The display unit may be configured to display only the current wait time for the attraction most proximate the display unit. In other embodiments, general display units are disposed in general locations (e.g., eating areas, walking paths, etc.) around the theme park. General display units may display current wait times for a plurality of attractions.

Figure 3:
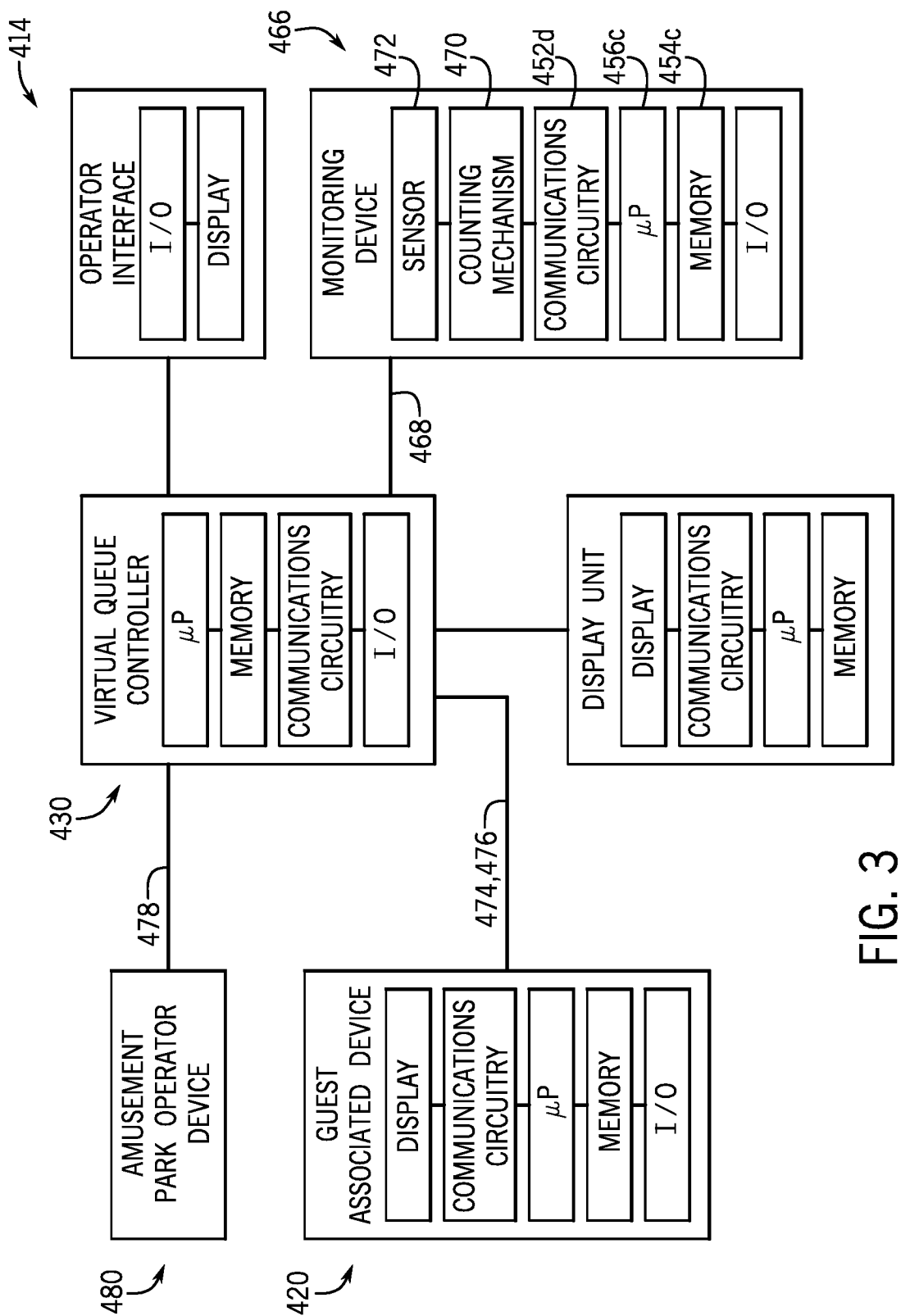
FIG. 3 is a block diagram of a queue monitoring system including a monitoring device in accordance with present techniques.

FIG. 3 is a block diagram of the queue monitoring system 430 having a monitoring device 466. In the present embodiment, the monitoring device 466 may have communication circuitry 452*d* to establish communication with the virtual queue controller 430. The monitory device 466 may also have a processor 456*c* and a memory device 454*c*. The monitoring device 466 is configured to monitor and/or determine current queue conditions and output a queue condition signal 468 to the virtual queue controller 430. Using both a physical queue and a standby area, a plurality of guests may be present at the attraction to fill the ride to max occupancy, even when a guest does not arrive on time. In certain embodiments, the monitoring device 466 is configured to monitor current queue conditions of the physical queue. However, the monitoring device 466 may be configured to monitor current queue conditions of the physical queue, the virtual queue, or a combination thereof.

In certain embodiments, the monitoring device 466 may be configured to monitor or determine current queue conditions, including, but not limited to, the length of the queue, number of guests in the queue, flow rate of the guests entering and exiting the queue, particular individuals within the queue (e.g., identify guests in the queue), number of sub-queues within the queue, types of guests within the queue, and so forth. In certain embodiments, the monitoring device 466 may monitor particular locations (e.g., geographical location, queue zones, etc.) within the queue and output the number of guests in each particular location to the virtual queue controller. In certain embodiments, the monitoring device 466 may monitor guests not just at the beginning or end of the queue, but may also monitor whether guests leave the queue in the middle of the queue. In certain embodiments, the monitoring device 466 may determine various characteristics of the guests (e.g., type, gender, age, number, etc.) within the queue and output that data to the virtual queue controller 430 to track and record historical throughput data associated with the queue as it relates to the attraction.

In certain embodiments, the monitoring device 466 includes a counting mechanism 470 configured to monitor queue conditions. For example, the number of guests within the queue may be monitored with a counting mechanism 470, which may be a manual system and/or may include one or more sensors disposed proximate to the queue. In other embodiments, the monitoring device may include at least one sensor 472 (e.g., optical sensors, cameras, mechanical treadles, RF sensing systems, etc.) disposed physically proximate to the queue, and communicatively coupled to the virtual queue controller 430. The sensors 472 may provide continuous feedback to the queue monitoring system 414 associated with current queue conditions. For example, in situations where guests each carry RF identification, RF sensors associated with the monitoring device may be configured to monitor when the particular guest(s) enters and exits the queue and output that data to the virtual controller. As a further example, the sensors 472 may be configured to recognize individual guests at the entrance and exit of the queue and continuously output that information to the virtual queue controller 430, such that various conditions of the queue (e.g., wait time, queue length, etc.) may be calculated based on length of time individual guests spend within the queue. In addition, the sensor data may be used to count admitted guests as provided herein. In another embodiment, the sensor 472 may be a camera that is positioned to capture multiple entrances and/or queues. Based on the image data from the camera/cameras, the virtual queue controller 430 may resolve or count guests for multiple queues at once. Further, the guest counting information may be used as input to one or more entrance control devices, such as a mechanical gate positioned at an entrance. Based on the remaining guest count, the mechanical gate may open or close.

Figure 4:
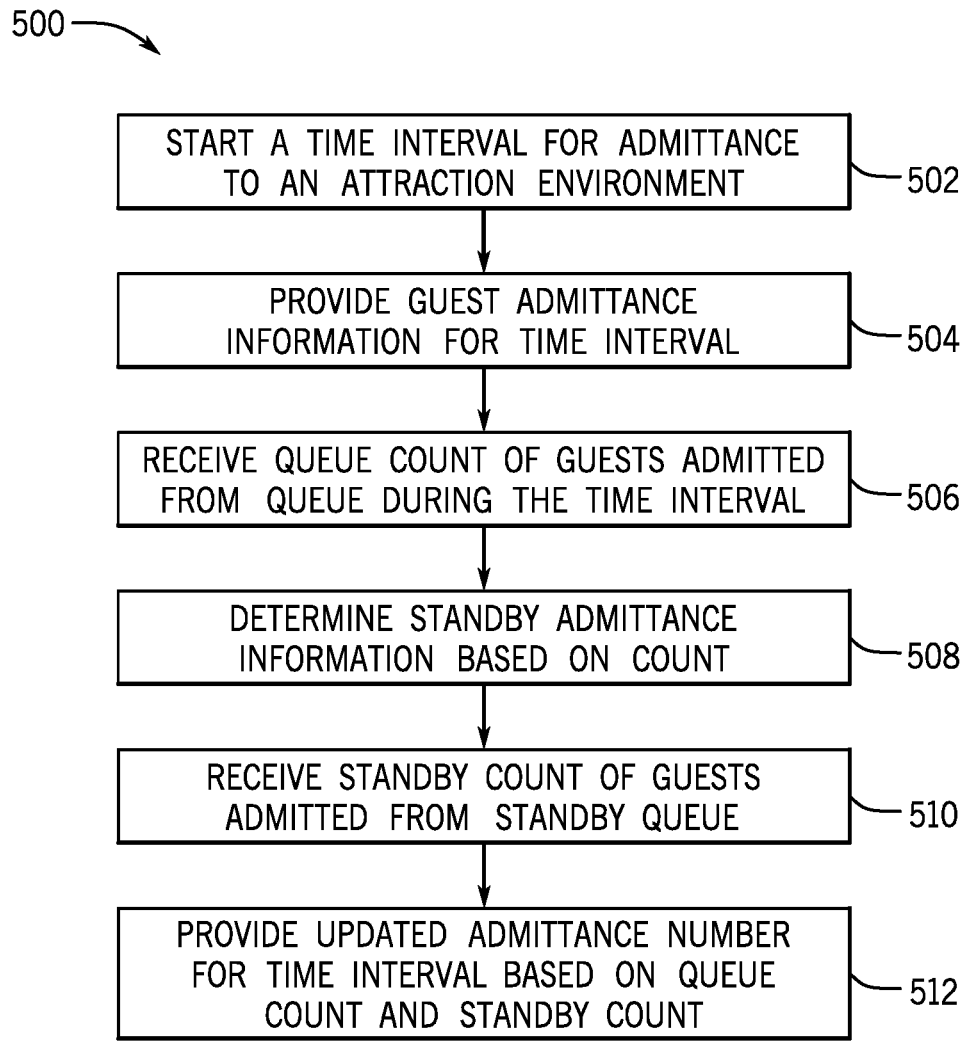
FIG. 4 is a flow diagram of a queue monitoring method in accordance with present techniques.

FIG. 4 is a flow diagram of a queue monitoring method 500. The method 500 starts with initiating a time interval for admittance (block 502), e.g., via an entrance, to an attraction environment. The time interval may be set based on central operator input and/or controller settings as provided herein. Each time interval is associated with guest admittance information that is provided to an operator device, e.g., operator device 480 of FIG. 3, and/or is displayed at a central controller, e.g., the virtual queue controller 430 of FIG. 3, at block 504. The guest admittance information may include a target number of guests to be admitted for each time interval. At the entrance location, the admitted guests are counted, either manually or via one or more monitoring devices, and the count of admitted guests is provided (block 506). Based on a difference between the target number and the admitted guests, a remaining number is determined (block 508) that is communicated to the appropriate operator device associated with the queue (block 510). If the remaining number is greater than zero, standby guests are admitted via a standby queue, and updated admittance numbers are provided for the time interval (block 512).

In certain embodiments, if the remaining number is greater than zero, the method 500 provides information to the operator device to wait until either the time interval has elapsed or only a portion of the time interval (e.g., less than 10%) is remaining to admit guests via a standby queue. In this manner, any guest shortfall from a return time entrance, designated for guests with mature return times, may be closed with guests from the standby queue. Because the time intervals may be set to occur frequently (e.g., every minute, every 2 minutes, every 5 minutes, every 10 minutes), the system permits frequent adjustments of numbers of standby guests entering the attraction environment. Further, the attraction throughput from guests holding return times and standby guests is dynamic and adjusts based on the available population of return time guests. This smooths out day-to-day or hour-to-hour variation in the timeliness of guests holding return times that are valid at any time during the day after the designated return time. For example, return times shortly after lunch may be associated with less timely guest arrivals. Any shortfalls of return time guests may be made up from the standby queue to keep attraction throughput high.

Figure 5:
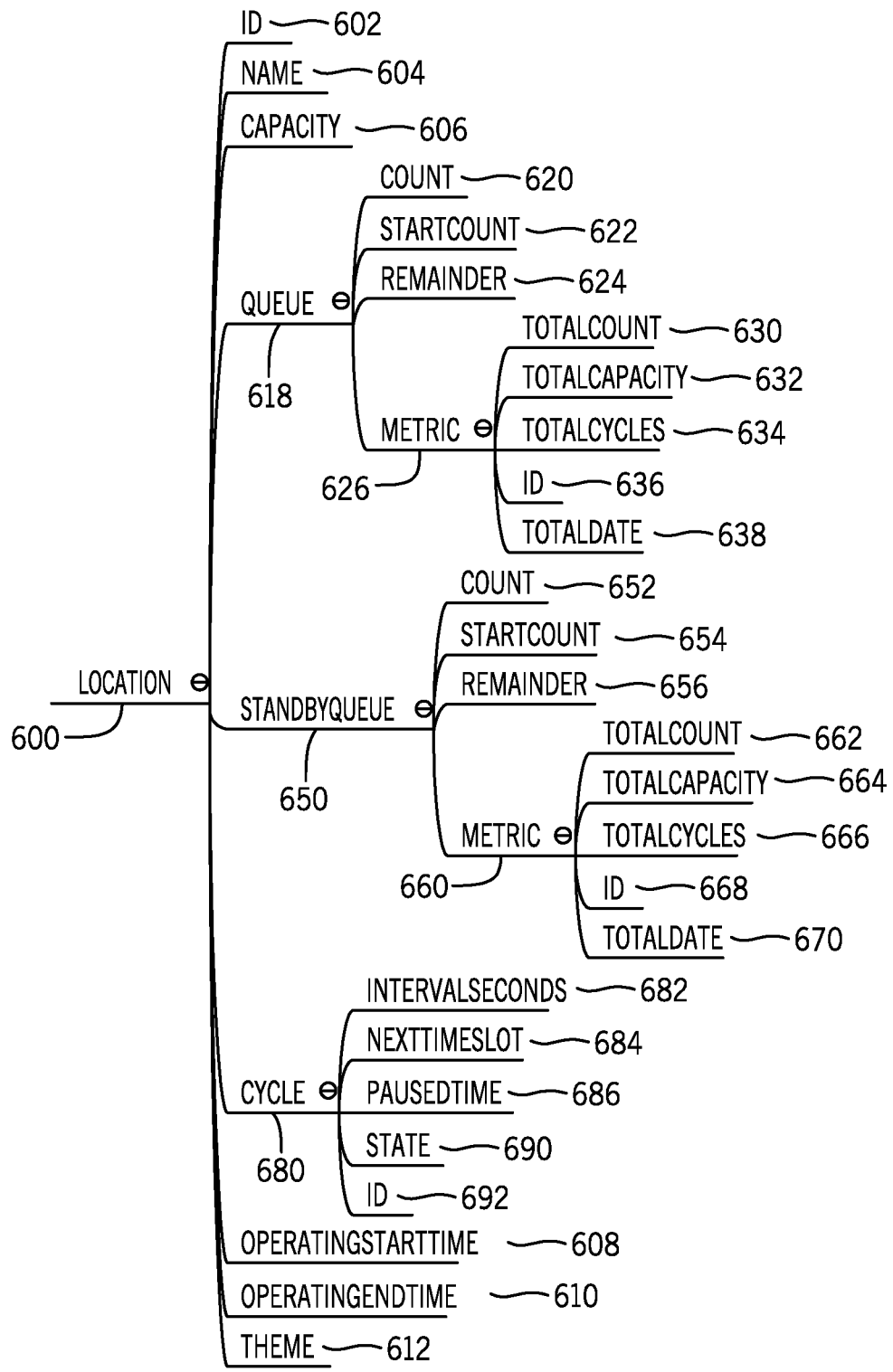
FIG. 5 is an embodiment of a data model in accordance with present techniques.

FIG. 5 is a data model of an individual location in accordance with the present techniques. Each location may correspond to an individual theme park location 600 that may include a ride or entertainment attraction. In the depicted embodiment, the location 600 includes a standby queue 650 and another queue 618 (e.g., a return time queue). Guests are admitted to one or more areas of the location 600 according to the attraction capacity over a cycle. The data model of each location 600 has associated location identification information (602), name information (604), capacity information (606), operating start time information (608), operating end time information (610), and, in certain embodiments, theme and graphic information (612). The data may be resident on the central controller (e.g., the virtual queue controller 330, 430) and provided to remote devices as appropriate. Accordingly, the data and instructions sent to an operator device associated with a particular location 600 may include the appropriate graphics and theming such that the various operator devices may be registered to the location 600 and further may be interchangeable upon a change in registration to a different location 600.

Each location 600 is associated with attraction-specific information such as cycle information 680 that may be pre-set by a central controller operator. The cycle information 580 may include a time interval length 680, a time remaining until a next time slot or interval 684, a pause time (686), and cycle state 690 and identification 692.

The data model 600 may provide the parameters used to admit guests to the location 600. For an individual cycle that defines a desired or pre-set guest cycle total of 100 guests per 300 second time interval, the guests are first admitted via the return time queue. The admitted guests are counted by the sensor or other counting mechanism, and these admitted guests are then subtracted from the guest cycle total. The location controller may permit guests from the return time queue to enter up until the end of the cycle (e.g., a cycle of 300 seconds), at which point any remaining guest capacity for the individual cycle is filled by the standby queue. Accordingly, the standby queue guests may be admitted from the standby queue in bursts at or near the end of each cycle or between individual cycles while the return time queue guests are admitted on a rolling basis throughout each individual cycle. Accordingly, the data model 600 includes queue information 618 (a target guest count 620 per interval, starting or current admitted guest count 622, and a remaining guest count 624) as well data metric information 626 (a total count 630, a total capacity 632, a total cycle number 634, and identification 636 and total per date 638 information).

Present embodiments also provide techniques to eliminate or reduce operator estimation of guest throughput. The counting may be performed by one or more sensors, the data provided to the central controller, and queue operators may be provided handheld displays that display a permitted number of guests to admit. The display of the standby queue operator, in one embodiment, may indicate "WAIT" or "ADMIT 20" (e.g., or the determined number of admits from the standby queue). As guests are admitted, the number of admits displayed may cycle down. For example, for an operator of the return time queue, the central controller may provide information that is displayed on the handheld display that return time guests are permitted to enter within the cycle until the total cycle capacity is reached. When the total cycle capacity is reached, the return time queue operator's handheld display may indicate that no more guests are to be admitted. For an operator of the standby queue, the hand held controller may indicate that the cycle is active (e.g., the active time period of the cycle during which return time guests are admitted). Once the cycle is near or at an end, the handheld display displays a number of remaining guests that may be admitted to reach the pre-set guest cycle total.

In certain embodiments, the total number of guests admitted per cycle may be smoothed or kept relatively stable for busy times for the location. Further, the proportion of guests from the queue and the standby queue may change cycle-to-cycle. For example, a first cycle may admit 80 return time queue guests and 20 standby guests while a subsequent second cycle may admit 50 return time queue guests and 50 standby guests. These changes may be driven by demand from the return time queue (which may represent guests with special ride permissions or passes, with pre-existing return times, and/or guest spots in a virtual queue) by guests that are permitted to enter the queue. Guests that are not permitted to enter the queue may enter the standby queue.

Figure 6:
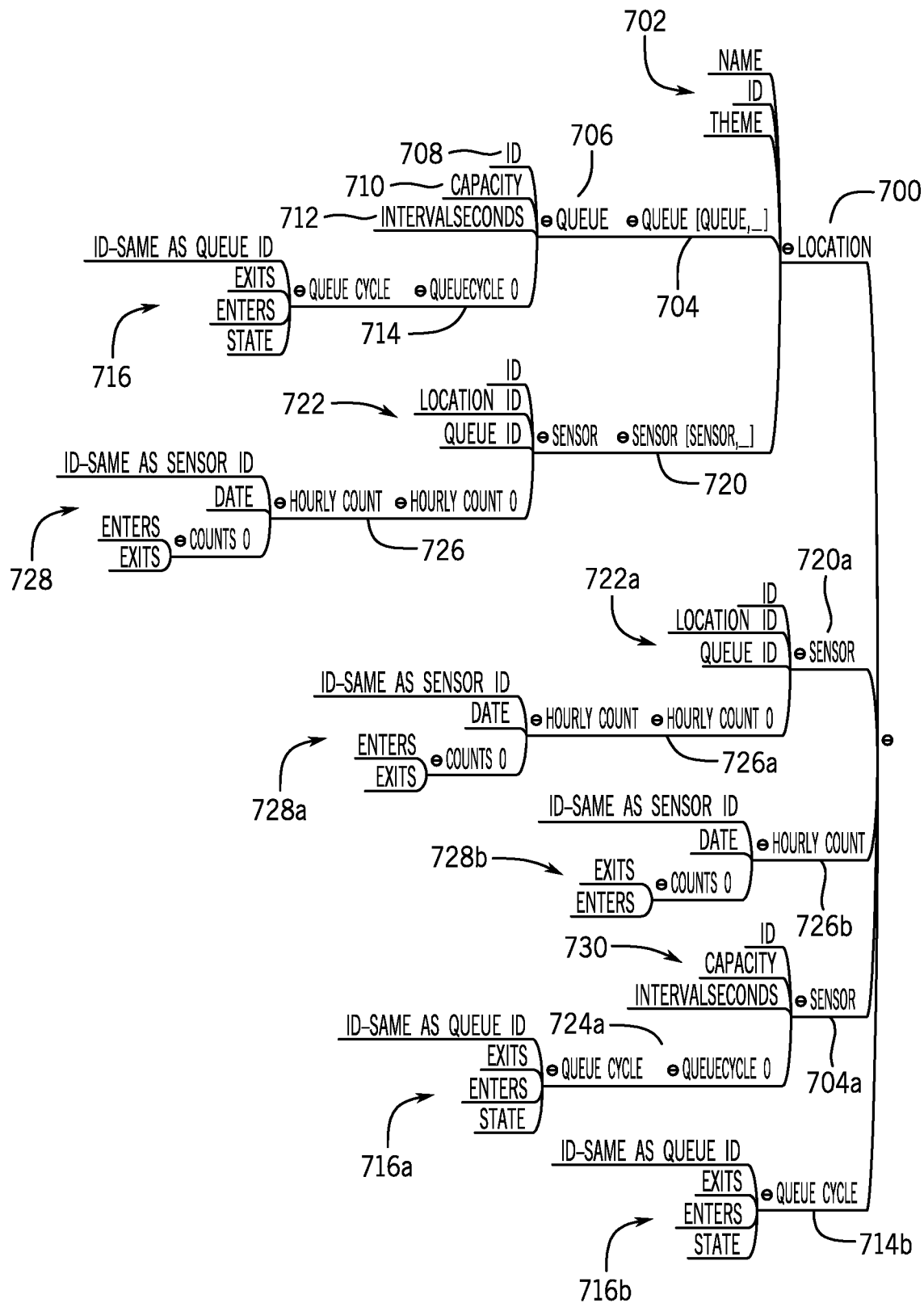
FIG. 6 is an embodiment of a data model in accordance with present techniques.

FIG. 6 is a data model of a system that permits multiple individual locations 700 to communicate with the central controller. Each individual location 700 may be configured according to the attraction specifications 702, and may further be associated with queue-specific information 706, such as queue identification information 708, capacity information 710, and interval information 712. For example, an individual location may be configured with one queue 704, two different queues 704, three different queues 704, etc. The data from each queue 704 may also be associated with the data from one or more individual sensors 720 located at the queue 704 and that count guests that are admitted via their designated queue 704. Further, each location may be associated with queue cycle data 716, such as enters, exits, and state information. Each location 700 may have an individualized cycle time and attraction capacity over the cycle time, depending of the type of attraction at the location.

The central controller may receive data from the sensors 720 at the respective locations 700, determine the remaining guests to be admitted to achieve the desired guest cycle total at each location, and provide information to operator handhelds at the queue at each location. Further, the sensor data may be used to determine hourly count data 726 and additional throughput information 728.

Additional locations 700 may be added in a modular manner. Further, the location 700 may be reconfigured as the attraction is updated to remove or add queues 704, and the system may be updated accordingly. While a single location 700 is depicted, it should be understood that additional locations are contemplated. Further, the handheld displays may be themed or customized to each individual location according to a theme of the attraction.

Figure 7:
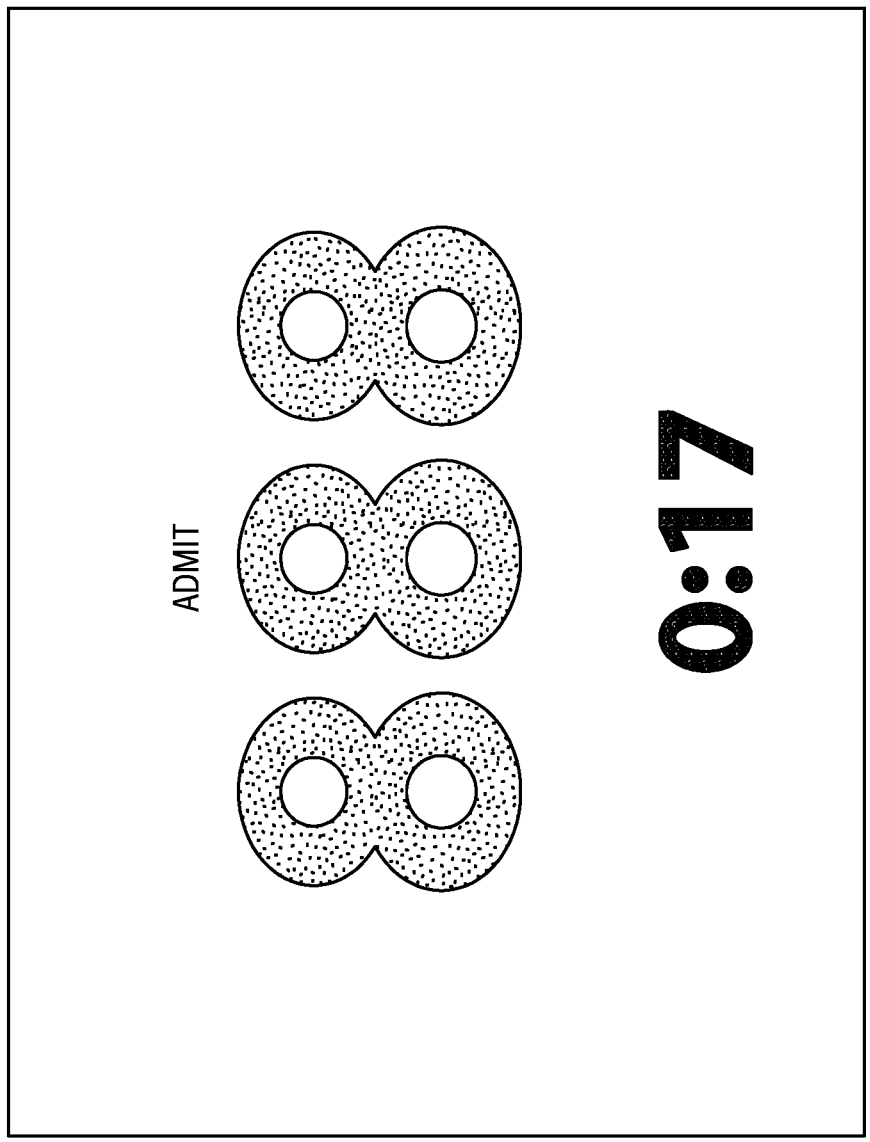
FIG. 7 is an example display of a display screen of an operator device in accordance with present techniques.
Figure 8:
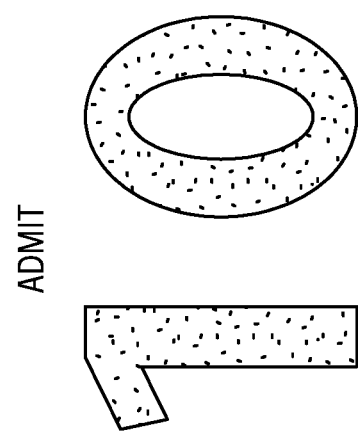
FIG. 8 is an example display of a display screen of an operator device in accordance with present techniques.
Figure 9:
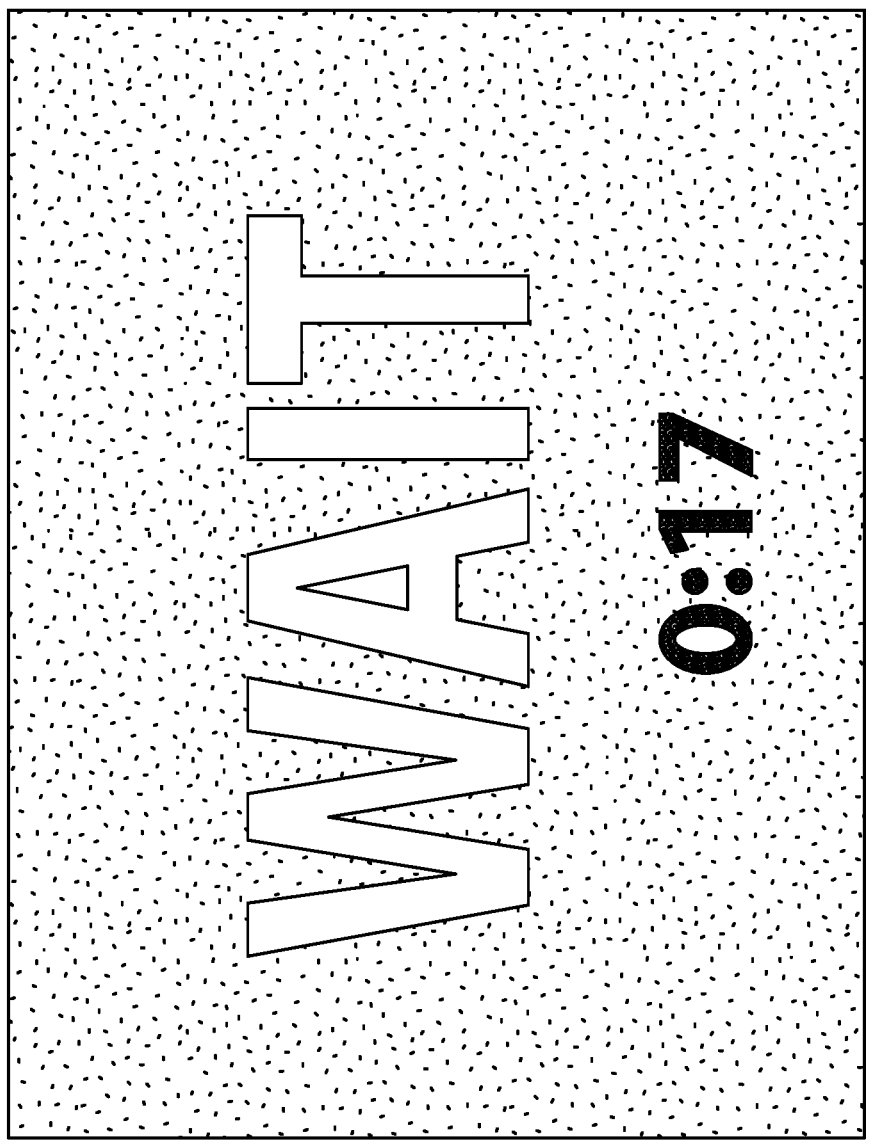
FIG. 9 is an example display of a display screen of an operator device in accordance with present techniques.

FIGS. 7-9 depict examples of screen displays of operator devices that may be used in conjunction with the present techniques. FIG. 7 shows a remaining guest admittance number and a time remaining in a time interval, e.g., a countdown. However, it should be understood that a count up-type display is also contemplated. Based on further indications (e.g., flashing screen, green color), the display may indicate that the entrance is in an admit mode. FIG. 8 shows a remaining guest admittance number and a time remaining in a time interval. In certain embodiments, the display may indicate when a number remaining is below a threshold. FIG. 9 shows a display screen in a WAIT mode in which no guests and/or standby guests are admitted.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A queue monitoring system, comprising:
one or more sensors associated with an entrance of an attraction and configured to generate a sensor signal, wherein the one or more sensors are configured to:
monitor guests in a first queue and a second queue for the attraction, wherein the sensor signal comprises an indication of waiting guests; and
monitor the guests admitted from the first queue via the entrance, wherein the sensor signal comprises a count of admitted guests;
a mechanical gate controlling passage of admitted guests from the first queue and a second queue into the attraction through the entrance; and
a virtual queue controller comprising a processor and communications circuitry, wherein the virtual queue controller is configured to:
communicate a target number of guests to be admitted into the attraction to an operator device to cause the operator device to display the target number of guests to be admitted into the attraction from the first queue or the second queue during a time interval;
generate instructions to open the mechanical gate to admit the guests from the first queue;
determine the count of the guests admitted from the first queue during the time interval based on the sensor signal;
determine a remaining number of remaining guests to be admitted based on a difference between the target number of guests to be admitted into the attraction and the count of the guests admitted from the entrance;
communicate a standby admit signal to the operator device to cause the operator device to display the remaining number of remaining guests to be admitted; and
determine that there are no waiting guests in the first queue subsequent to admitting the guests from the first queue based on the sensor signal; and
generate instructions to open the mechanical gate to admit the remaining number of guests, wherein the remaining number of guests are admitted from the second queue only after the time interval is elapsed or mostly elapsed and based on the remaining number being greater than zero and the determining that there are no waiting guests in the first queue.

2. The queue monitoring system of claim 1, wherein the one or more sensors comprise a camera configured to generate image data, and wherein the controller is configured to identify individual guests in the image data to determine the count of guests admitted from the entrance.

3. The queue monitoring system of claim 2, wherein the first queue is a virtual queue entrance that is fed by guests holding mature return times.

4. The queue monitoring system of claim 3, wherein the camera is positioned to further monitor standby guests admitted via the second queue.

5. The queue monitoring system of claim 4, wherein the virtual queue controller is configured to update the remaining number after the guests from the second queue are admitted.

6. The queue monitoring system of claim 1, wherein virtual queue controller is configured to start a new time interval after the time interval has elapsed, wherein the target number of guests to be admitted during the new time interval is equal to the target number of guests to be admitted during the time interval.

7. The queue monitoring system of claim 6, wherein a length of the new time interval is equal to the time interval.

8. The queue monitoring system of claim 1, wherein the virtual queue control communicates a control signal to the mechanical gate of the entrance.

9. The queue monitoring system of claim 8, wherein mechanical gate is open to admit guests from the first queue or the second queue until the count of guests admitted from the entrance is equal to the target number.

10. A queue monitoring method, comprising:
starting a time interval for admittance via an entrance;
providing a target guest admittance of the time interval;
generating a first control signal to open a mechanical gate responsive to starting the time interval;
receiving a first count of guests admitted via a first queue through the mechanical gate;
determining standby admittance information from a second queue based on a difference between the received first count from the first queue and the target guest admittance of the time interval, wherein the standby admittance information comprises a remaining number of admittances that is greater than zero to be admitted via the mechanical gate;
communicating a standby admit signal to an operator device to cause the operator device to display the remaining number of admittances to be admitted via the mechanical gate;
receiving a second count of guests admitted via the second queue through the open mechanical gate; and
generating a second control signal to close the mechanical gate when the second count equals the remaining number.

11. The queue monitoring method of claim 10, comprising starting a new time interval after the time interval has elapsed.

12. The queue monitoring method of claim 11, comprising resetting the target guest admittance after the time interval has elapsed.

13. The queue monitoring method of claim 10, comprising communicating a wait signal upon a determination that the remaining number is greater than zero and that an insufficient portion of the time interval has elapsed.

14. The queue monitoring method of claim 13, subsequent to communicating the wait signal, communicating the standby admit signal after the time interval has elapsed.

15. A queue monitoring system, comprising:
a virtual queue controller comprising a processor and communications circuitry, wherein the virtual queue controller is configured to:
communicate guest admittance information comprising a target number of guests to be admitted through an entrance during a time interval;
control opening of a mechanical gate to the entrance;
determine a count of guests admitted through the mechanical gate during the time interval based on a generated sensor signal; and
determine standby information, the standby information comprising a remaining number of standby guests to be admitted based on a nonzero difference between the target number of guests to be admitted and the count of guests admitted from the entrance; and
communicate the standby information based on the remaining number;
and
an operator device configured to:
receive the guest admittance information and the standby information;
display the target number of guests to be admitted and time interval information comprising time remaining in the time interval;
display the standby information; and
receive an operator input of standby guest admittances during the time interval;
wherein the virtual queue controller controls closing of the mechanical gate responsive to the standby guest admittances equaling the remaining number.

16. The queue monitoring system of claim 15, wherein the operator device is configured to change a displayed admittance status of standby guests based on the time remaining in the time interval.

17. The queue monitoring system of claim 16, wherein the operator device is configured to change the displayed admittance status of standby guests to indicate permitted entrance up to the remaining number after the time interval has elapsed.

18. The queue monitoring system of claim 16, wherein the virtual queue controller is configured to receive controller inputs to set one or more of the target number, a length of the time interval, and a number of time intervals per day.

19. The queue monitoring system of claim 1, wherein the generated instructions cause the mechanical gate to open to the second queue when less than 10% of a total time of the time interval is remaining.

20. The queue monitoring system of claim 5, wherein the virtual queue controller is configured to generate instructions to close the mechanical gate to the first queue and the second queue when the updated remaining number is zero.

* * * * *